Nov. 8, 1949   W. R. BAKER   2,487,510
CURRENT INTEGRATING NETWORK
Filed Nov. 12, 1947
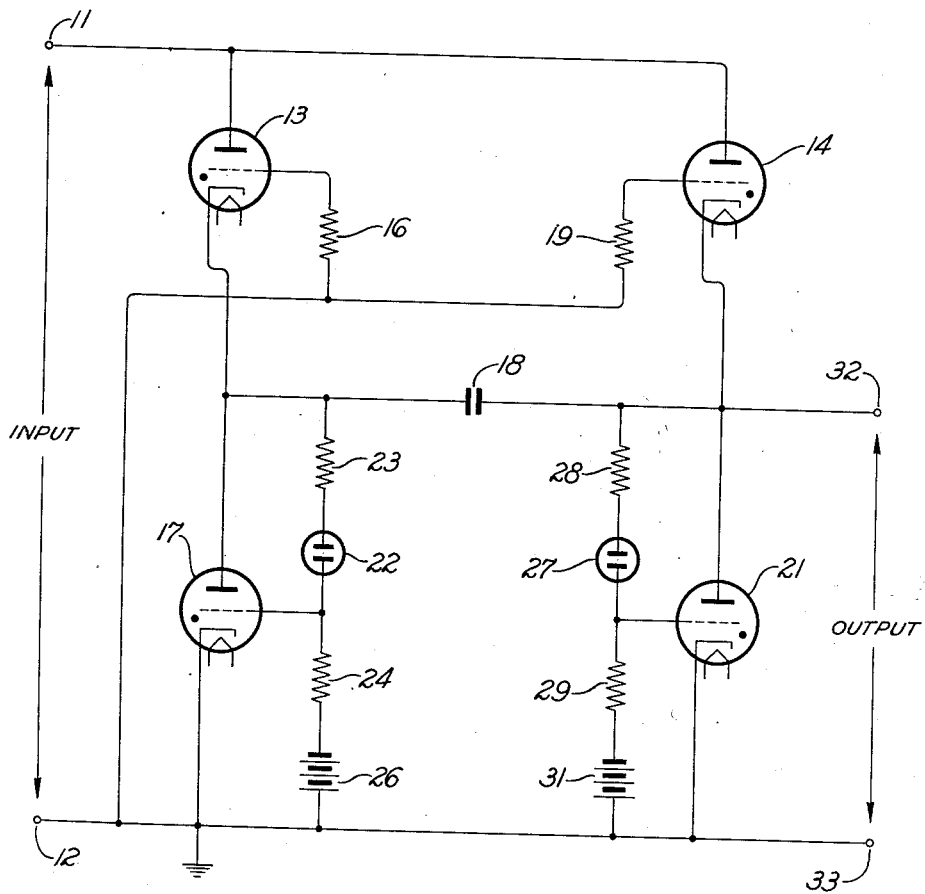
INVENTOR.
WILLIAM R. BAKER
BY
Robert A. Launder
ATTORNEY Patented Nov. 8, 1949

2,487,510

UNITED STATES PATENT OFFICE 2,487,510

CURRENT INTEGRATING NETWORK

William R. Baker, Berkeley, Calif., assignor to the United States of America as represented by the United States Atomic Energy Commission Application November 12, 1947, Serial No. 785,411

3 Claims. (Cl. 320—1)

This invention relates to an electronic circuit which produces an output proportional to the quantity of the input, or more particularly to a current integrating circuit.

In certain electronic circuits it is desired to obtain an indication of the quantity of current flowing in a given device. This indication can be obtained by using the present invention in addition to a register or some similar recording apparatus. Instead of using the output of this invention to operate a register, it is also possible to operate a second circuit each time a predetermined quantity of current has accumulated.

It is therefore an object of this invention to provide an electronic current integrating circuit.

Another object of this invention is to provide a current integrating network having great accuracy and sensitivity.

A further object of this invention is to provide a current integrating circuit of great simplicity and compactness.

A still further object of this invention is to provide an electronic circuit which will charge and discharge a condenser at a rate which is a function of the current being integrated.

Further objects and advantages of the invention will be apparent in the following description and claims considered together with the accompanying drawing, in which:

The figure is a schematic wiring diagram embodying the invention and is the sole drawing thereof.

Referring to the drawing in detail, it is seen that there are two input terminals 11 and 12. The input terminal 11 is connected to the plate leads of two triode gaseous discharge tubes 13 and 14, and the input terminal 12 is connected to ground. The control grid lead of the tube 13 is connected to a resistor 16 which in turn is connected to the input terminal 12. The cathode lead of the tube 13 is connected to the plate lead of a triode gaseous discharge tube 17 and to one terminal of a condenser 18. The control grid lead of the tube 14 is connected to a resistor 19 which is in turn connected to the input terminal 12. A further connection of the tube 14 is from the cathode lead to the plate lead of a triode gaseous discharge tube 21 and to the remaining terminal of the condenser 18. The control grid lead of the tube 17 is connected to the plate lead thereof by means of a neon bulb 22 and a resistor 23. A further connection of the control grid lead is made to a series connected resistor 24 and battery 26, the latter of which is connected to the terminal 12. The cathode lead of tube 17 and terminal 12 are interconnected. Further connections of the tube 21 are: the control grid lead is connected to the plate lead by a series connected neon bulb 27 and resistor 28 and to the terminal 12 by the series connected resistor 29 and battery 31, and the cathode lead is connected directly to the terminal 12. The output terminals 32 and 33 are connected to the plate lead and the cathode lead of the tube 21, respectively.

Consider now the operation of the invention. With an input connected to the terminals 11 and 12, either the gaseous discharge tubes 13 and 21 or 14 and 17 conduct to charge the condenser 18. Assume that the tubes 14 and 17 are conducting, which may be achieved by momentarily removing the negative bias on the control grid of the tube 17. The tube 21 will be maintained in a nonconducting state by the grid bias battery 31 and since the condenser 18 becomes charged by the current flowing through the tubes 14 and 17, the tube 13 will be maintained in a nonconducting state by the voltage drop across the tube 14 and the condenser 18. As the voltage across the condenser 18 increases, an increasing positive potential is thereby impressed at the plate of the tube 21. When this voltage reaches a sufficiently high value, the neon bulb 27 conducts, driving the control grid of the tube 21 positive, thereby rendering the tube conducting. As the condenser 18 discharges, the plate of the tube 17 becomes negative, thereby rendering the tube nonconducting. In a similar manner, the charge on the condenser 18, which places a positive potential on the plate of the tube 21, raises the potential of the cathode of the tube 14 until the tube is rendered nonconducting. At the time the charge is removed from the condenser 18, the cathode of the tube 13 becomes negative with respect to its plate and the tube conducts, causing the condenser to charge in the opposite direction. Thus, since the condenser 18 charges at a rate proportional to the rate at which current is flowing, it is possible to determine the quantity of current from the number of times the charging of the condenser 18 reverses. A register or a following circuit may be operated by the output from the terminals 32 and 33.

While the salient features of this invention have been described in detail with respect to one embodiment, it will, of course, be apparent that numerous modifications may be made within the spirit and scope of this invention. I do not therefore desire to limit the invention to the ex-

What is claimed is:

1. A current integrating network comprising four gaseous discharge tubes hereafter referenced as the first, second, third, and fourth tubes each having at least an anode, a control grid, and a cathode, means for connecting the cathode of said first tube to the anode of said third tube, means for connecting the cathode of said second tube to the anode of said fourth tube, a condenser for storing energy connected between the cathode of said first and second tubes, means for normally maintaining the control grid of said first and second tubes at zero potential, means for normally maintaining the control grid of said third and fourth tubes sufficiently negative to hold the tubes in a nonconductive state, means including a first neon lamp connected between the anode and control grid of said third tube, means including a second neon lamp connected between the anode and control grid of said fourth tube, means for connecting the cathode of said third and fourth tubes, and means for connecting the anode of said first and second tubes whereby the current of a device connected between the anode of said first tube and the cathode of said third tube is integrated and thereby determinable at the anode of said fourth tube.

2. In an integrating network, the combination comprising a first pair of gaseous discharge tubes, a condenser connected between said first pair of tubes for storing energy to a predetermined value as a function of the current to be integrated, said first pair of tubes becoming nonconducting when said condenser has been charged, a second pair of gaseous discharge tubes connected to said condenser, means for discharging said condenser and rendering said second pair of tubes conductive whereby said condenser is charged in the opposite direction, and second means for discharging said condenser whereby said first pair of tubes is again rendered conductive.

3. In an integrating network, the combination comprising a first pair of gaseous discharge tubes, condenser means connected between said first pair of tubes for storing energy to a predetermined value as a function of the current to be integrated, said first pair of tubes becoming nonconducting when said condenser has been charged, a second pair of gaseous discharge tubes connected to said condenser, glow discharge means for discharging said condenser and rendering said second pair of tubes conductive whereby said condenser is charged in the opposite direction, and second glow discharge tube means for discharging said condenser whereby said first pair of tubes is again rendered conductive.

WILLIAM R. BAKER.

REFERENCES CITED

The following references are of record in the file of this patent:

UNITED STATES PATENTS

| Number | Name | Date |
|---|---|---|
| 2,112,031 | Knowles | Mar. 22, 1938 |
| 2,247,728 | Langer | July 1, 1941 |
| 2,310,328 | Swift | Feb. 9, 1943 |
| 2,392,632 | Berry | Jan. 8, 1946 |

FOREIGN PATENTS

| Number | Country | Date |
|---|---|---|
| 548,618 | Great Britain | Oct. 16, 1942 |